F. G. Foster.
Setting Type.
N° 84273. Fig. 1. Patented Nov 24, 1868
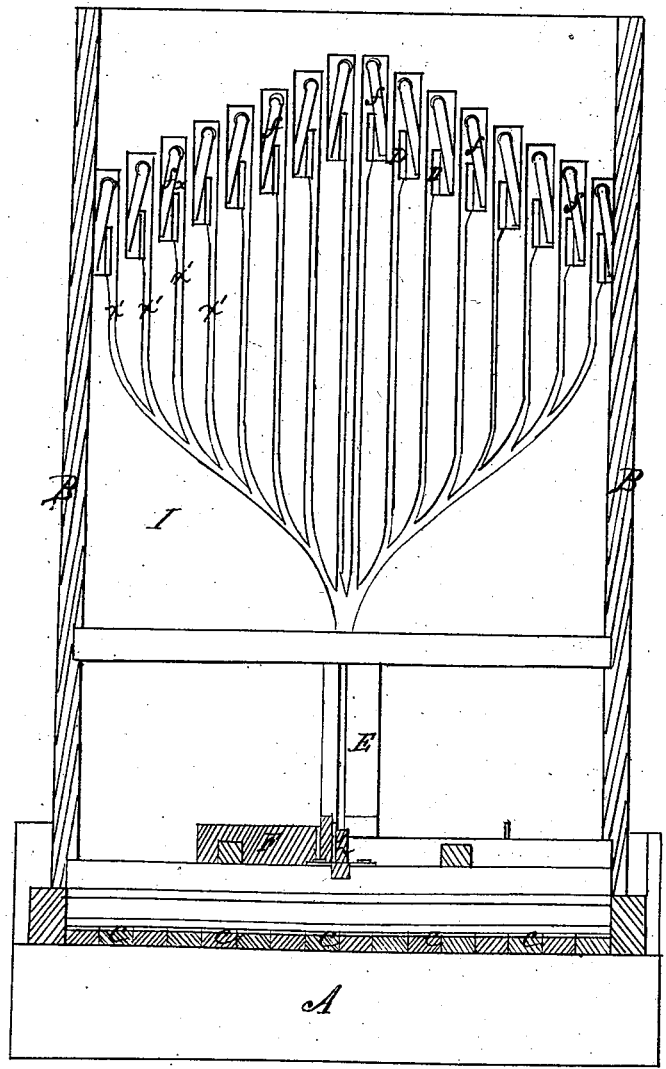
Fig. 3.
Witnesses
Leopold Evert,
Harry King
F. G. Foster,
Inventor.

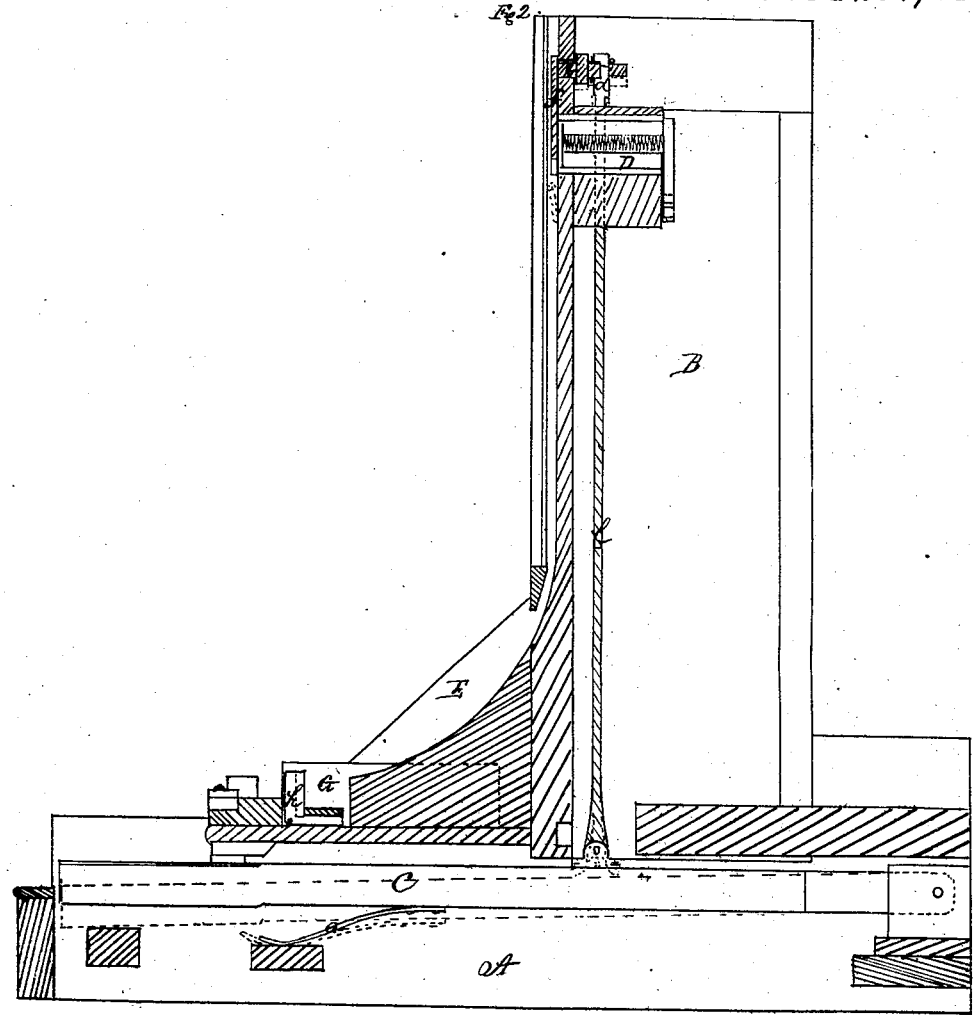

United States Patent Office.

F. G. FOSTER, OF EAGLE ROCK, NORTH CAROLINA.

*Letters Patent No. 84,273, dated November 24, 1868.*

IMPROVEMENT IN TYPE-SETTING MACHINES.

The Schedule referred to in these Letters Patent and making part of the same.

*To all whom it may concern:*

Be it known that I, F. G. FOSTER, of Eagle Rock, in the county of Wake, and in the State of North Carolina, have invented certain new and useful Improvements in Type-Setting Machines; and do hereby declare that the following is a full, clear, and exact description thereof, reference being had to the accompanying drawings, and to the letters of reference marked thereon.

The nature of my invention consists in the construction and general arrangement of a type-setting machine, by which type can be set with the utmost rapidity, and, at the same time, with such a correctness and ease that anybody can operate the same, and no errors need be committed, provided the type are distributed correctly. The peculiarities of the invention will be hereafter set forth.

In order to enable others skilled in the art to make and use my invention, I will now proceed to describe its construction and operation, referring to the annexed drawings, which form a part of this specification, and in which—

Figure 1 is a front view;

Figure 2, a side section;

Figure 3, front view of one of the type-boxes;

Figure 4, side section of the device for discharging the justified lines of type; and Figure 5 is a view of the stick.

Figure 6 is a rear view of the connection operating the fingers which move the types.

A represents a box or frame, near the centre of which is another box, B, placed upright on the same.

In the box A is a series of keys, C C, which are pivoted in the rear end of the box, and extend the whole length of the same, each being provided on its under side with a spring, *a*, so that the keys are always held up in their places when not pressed upon by the operator.

Near the centre of each key, a rod, *b*, is pivoted, which extends upwards through the box B, and its upper end is connected with a small lever, *d*, this lever being secured to a journal, *e*, which passes through the front side of the box B, and there secured to a finger, *f*, extending downwards, and the use of which will be hereinafter described.

In the upper part of the box B is placed a series of type-boxes, D D, which are slotted the exact width of the type, and the front ends of which extend through a part of the front side I of the box B, so as to make an even surface, with recesses and grooves cut in the front side thereof, as shown in fig. 1.

The plate I, constituting the front side of the box B, is cut with a number of recesses, *x x*, in which, as described, the ends of the type-boxes D D open, and the fingers *f f* are so placed in these recesses, that, when the keys C C are in their proper position, the said openings of the type-boxes are left uncovered.

From each recess a groove, *x′ x′*, leads down towards the centre of the box, and into a curved groove on the slotted piece E, which comes out on the top of the box A.

The whole front side of the box B is covered with a piece of glass, leaving the grooves and recesses therein deep enough to allow the types to drop through freely.

The types are placed in the type-boxes D D from the rear, and a coil-spring, *g*, is placed in the slot, which is rounded near its centre for that purpose, which spring presses the type forward through the front side I, and against the glass. When, now, the key corresponding to this type-box is touched, the finger *f* will move the type to the groove, allowing it to drop down; but the finger, at the same time, covers the opening to the type-box, preventing any more type from coming out until the pressure is removed from the key, when the finger springs back, uncovering the type-box, and allowing the next type to come forward ready for the next touch on the same key.

On the front end of the coil spring *g* is a piece of metal secured, which corresponds with the slot in the type-box, and extends a trifle above the same, so that when it is desired to load the box, the spring can easily be compressed into a recess of a button, which is placed on the rear of the box and holds the spring. When the spring is thus compressed into the button, the button is turned and the box loaded. As soon as the button then is placed in its proper position, the spring, with its piece of metal attached, will act on the type, pressing it forward as already described.

When a type thus falls down through the curved groove in the guide E, it is discharged into a composing-stick, *h*, by the mere force of its own fall, the groove in the guide E being so curved that the type will fall down with the heel towards the operator.

The composing-stick *h* consists of a piece of metal, bent at right angles, and pivoted at the corner forming the angle. One side of the composing-stick is flanged so as to hold the type while "justifying" it, and it is adjustable to suit any length of line required; the part of the frame on which the stick rests being also adjustable for the same purpose.

The setting-rule G, which slides in the lower part of the guide E, is extended along the side of the composing-stick, and as soon as one line is completed the stick is turned over, the type justified, the stick turned back again, and the rule slid back, when a slide, *i*, moves the type into the galley F, just so far as to allow the rule G to be again placed alongside of the stick. This is continued till the galley is full, when it may be removed and emptied.

The front part of the box B, with the type-boxes D D, is made movable, so that by unhooking the rods *b b* from the keys C C, the whole front of the box, type-boxes, and guides can be removed, and another front, with other type-boxes and guides for another font of type, can easily be substituted.

In rear of the front plate I, with its type-boxes, there may be placed similar plates and boxes, as many as may be required, each connected with its own set of keys, so that in each plate type of the same thickness is placed, by which arrangement space may be economized, as the machine would be of lesser dimensions than if all were arranged in one plate, as represented.

The type-boxes D D are so arranged that the types, in falling down the grooves, will each have such a distance to travel to the guide E, considering the velocity of bodies falling down inclined planes of different heights, that every letter reaches the stick in the order the operator touches the keys.

Having thus fully described my invention,

What I claim as new, and desire to secure by Letters Patent, is—

1. The arrangement of the removable vertical plate I, when provided with recesses $x\,x$, and grooves $x'x'$, as described, and entirely covered with a glass or other transparent plate, with the type-boxes D D and fingers $f\,f$ acting in the recesses $x\,x$, substantially as and for the purposes herein set forth.

2. The type-box D, constructed as described, and provided with a spring, $g$, to press the type forward, substantially as herein set forth.

3. The arrangement of the fingers $f\,f$, placed in the recesses on the plate I, in combination with the journal $e$, lever $d$, rod $b$, and the key C, all constructed as described, and the fingers operating so as to force the type down in the grooves, substantially as herein set forth.

4. The guide E, constructed as described, with a curved groove to guide the type properly into the composing-stick, as herein set forth.

5. The combination of the setting-rule G, composing-stick $h$, slide $i$, and galley F, all constructed as described, and operating as and for the purposes herein set forth.

6. The setting-rule G, constructed and working in the manner and for the purposes herein set forth.

In testimony that I claim the foregoing, I have hereunto set my hand, this 9th day of July, 1868.

F. G. FOSTER.

Witnesses:
 LEOPOLD EVERT,
 HARRY KING.